United States Patent [19]

Dion et al.

[11] Patent Number: 5,709,749

[45] Date of Patent: Jan. 20, 1998

[54] SOLVENT SUPPLY FOR PAINT SPRAYER

[75] Inventors: Mark E. Dion, St. Clair Shores; Bernard J. McCabe, Riverview, both of Mich.

[73] Assignee: Behr Systems, Inc., Auburn Hills, Mich.

[21] Appl. No.: 296,004

[22] Filed: Oct. 3, 1994

[51] Int. Cl.⁶ ............................................. B05B 17/00
[52] U.S. Cl. ................ 118/302; 134/166 R; 134/167 C; 134/168 C; 137/501
[58] Field of Search ........................... 118/302, 663; 239/106, 113, 120, 311; 134/166 R, 167 C, 168 C, 169 C; 137/563, 501

[56] References Cited

U.S. PATENT DOCUMENTS

| | | | |
|---|---|---|---|
| 3,572,366 | 3/1971 | Wiggins | 137/563 |
| 4,403,736 | 9/1983 | Scharfenberger | 118/302 |
| 4,828,218 | 5/1989 | Medlock | 118/663 |
| 4,881,563 | 11/1989 | Christian | 134/166 |
| 4,993,353 | 2/1991 | Ogasawara et al. | 118/302 |
| 5,074,237 | 12/1991 | Ogasawara | 118/302 |

*Primary Examiner*—Laura Edwards
*Attorney, Agent, or Firm*—Howard & Howard

[57] ABSTRACT

A cleaning apparatus (10) for removing residual paint from flow passages in a spray painting system comprises a flow passage (12) for conveying paint to a spraying device (14) and a manifold (16) defining a plurality of individual inlets (17) into the flow passage. At least two different paints are supplied to the manifold through the inlets. A solvent supplier (20) supplies a variable pressure and variable volume flow of solvent to the manifold (16) during a cleaning cycle to remove residual paint from the manifold and the flow passage (12) after a completed painting cycle to prepare for a new cycle. The assembly is characterized by including a constant volume flow controller (22) for maintaining a constant volume flow of solvent upstream of the manifold (16) independent of solvent pressure fluctuations.

16 Claims, 3 Drawing Sheets

5,709,749

1

SOLVENT SUPPLY FOR PAINT SPRAYER

TECHNICAL FIELD

The subject invention relates to coating spraying systems of the type used to coat surfaces with a coating such as paint, and more particularly to coating systems having a cleaning apparatus for cleaning residual coating material from the system after a given coating cycle.

BACKGROUND OF THE INVENTION

It is well known in the spray painting art to purge the internal paint conducting passages of a paint spraying system with a solvent to remove residual paint from the passages to prepare for a new painting cycle. U.S. Pat. No. 4,881,563 to Christian typifies the state of the art in such purging systems. It teaches a system which atomizes the solvent at the most upstream portion of a paint supply manifold by mixing a liquid solvent with pressurized air in the manifold. Atomized solvent effectively cleans or purges the internal passages of the paint sprayer, and does so with relatively less solvent than earlier methods which used unatomized liquid solvent. Thus, Christian teaches a system which, if it works as intended, will clean a paint spraying system in an efficient and environmentally conscious manner.

Unfortunately, the system may not always work as intended. Whether the solvent atomizes in optimal manner, or at all, depends on the volume of solvent mixing with the air. The volume of solvent supplied to the locus of atomization is typically a function of solvent pressure which, in even the most controlled systems, is subject to variation. The prior art fails to teach an apparatus which will ensure a constant volume supply of solvent independent of solvent pressure.

SUMMARY OF THE INVENTION AND ADVANTAGES

A cleaning apparatus of the type for removing residual coating material from flow passages in a coating material distribution system comprises a flow passage for conveying coating material to a spraying device and a manifold defining a plurality of individual inlets into the flow passage. Coating supply means supplies at least two different coating materials to the manifold. Solvent supplies means supply a variable pressure and variable volume flow of solvent to the manifold during a cleaning cycle to remove residual coating material from the manifold and flow passage after a completed coating cycle to prepare for a new coating cycle. The assembly is characterized by flow controlling means for maintaining a constant volume flow of solvent to the manifold independent of solvent pressure fluctuations.

A corresponding method for removing residual coating material from the internal coating conducting passages of a manifold of a coating sprayer assembly includes the steps of: supplying pressurized air to the passages of at least one manifold to remove most of the coating material after a coating operation; and supplying solvent from a solvent source to the manifold to remove the residual coating material from the passages. The method is characterized by maintaining a constant volume flow of solvent upstream of the manifold independent of solvent pressure fluctuations.

Providing a constant volume flow of solvent to the locus of atomization ensures that the solvent will be atomized in the desired manner.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
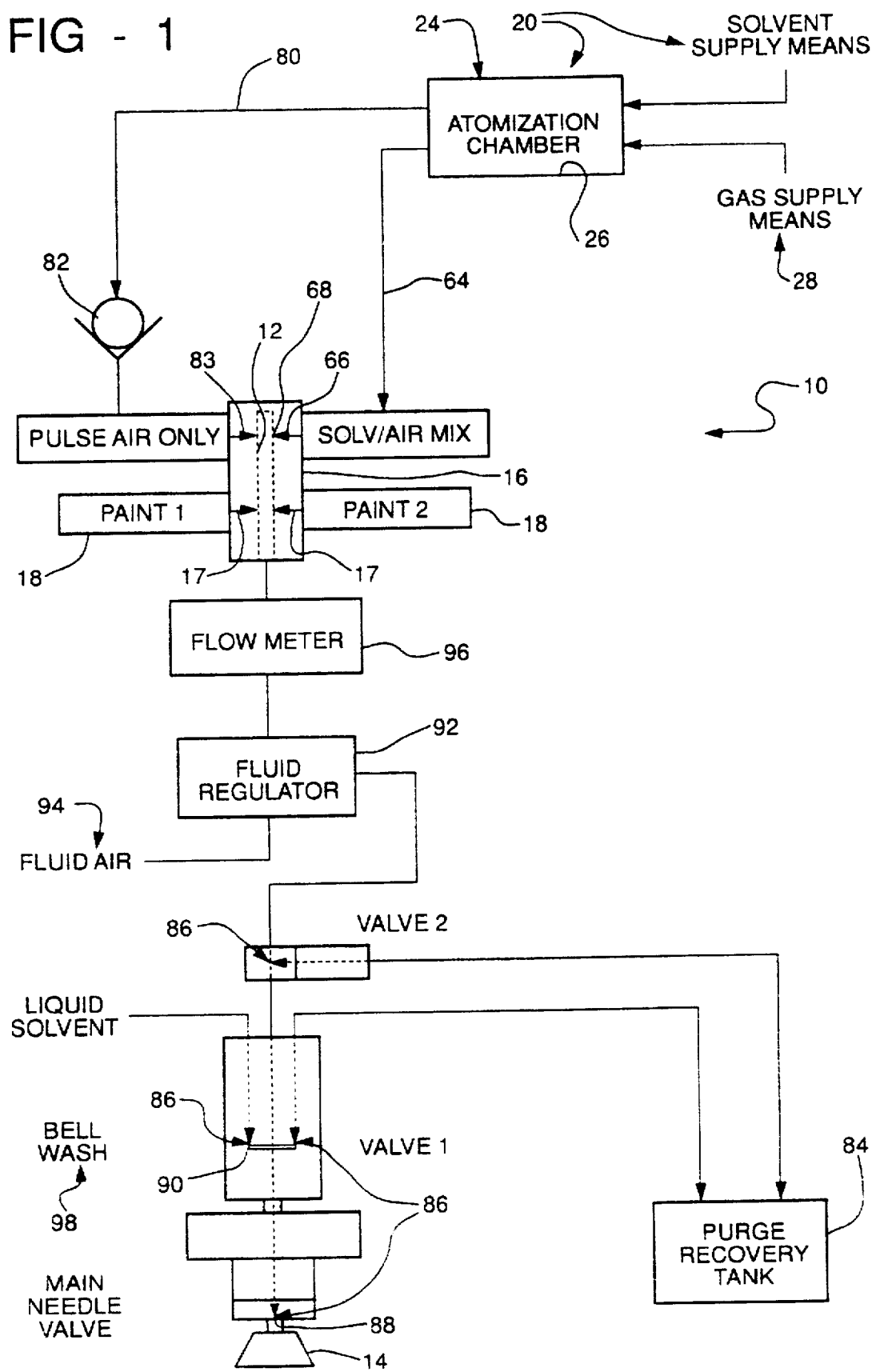
FIG. 1 is a schematic diagram of the cleaning apparatus as it relates to the paint spraying system.
Figures 2, 5:
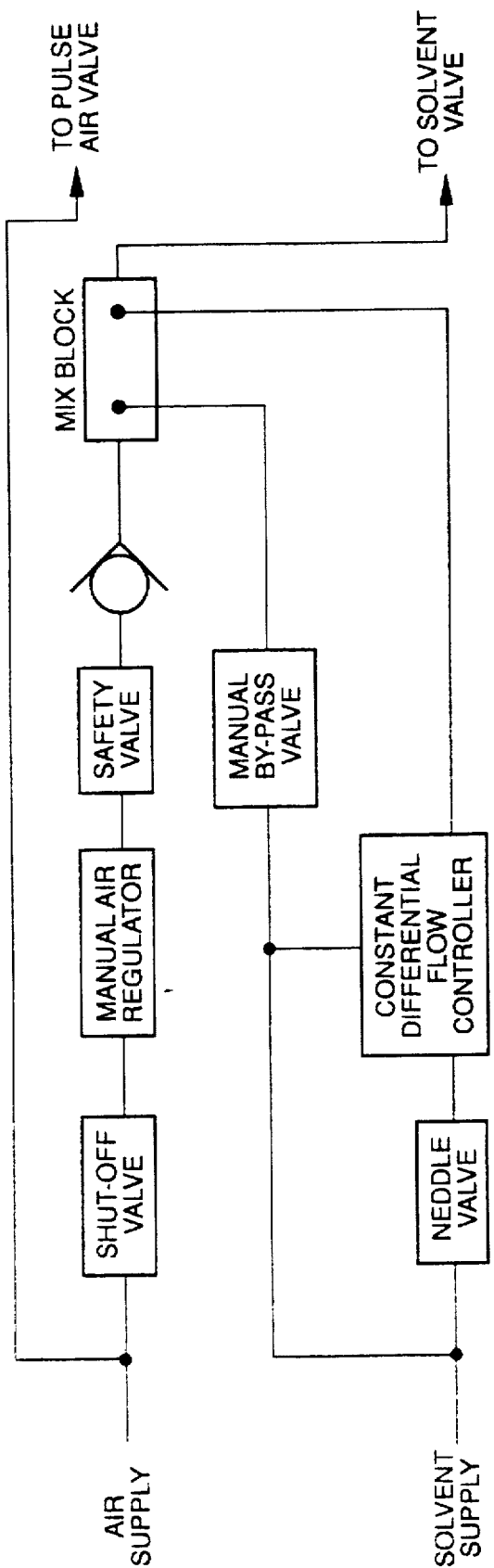
FIG. 2 is a schematic diagram of the cleaning apparatus upstream of the paint manifold showing the atomization means.
Figure 3:
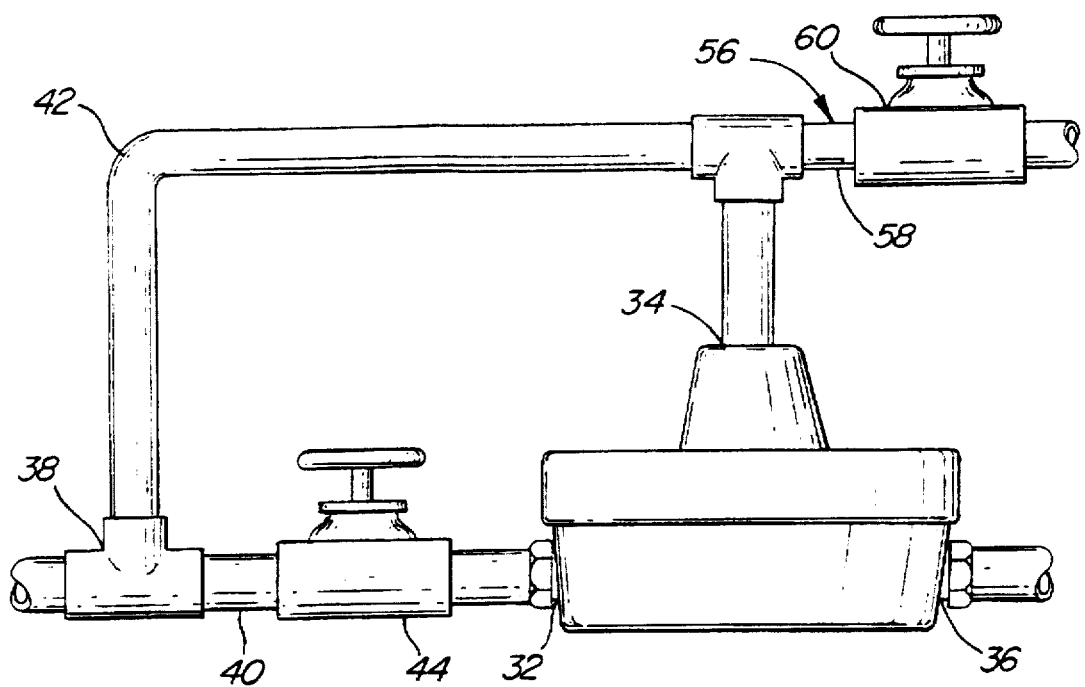
FIG. 3 is a side view of the constant volume flow controlling means including the needle valve and the constant differential flow controller.
Figure 4:
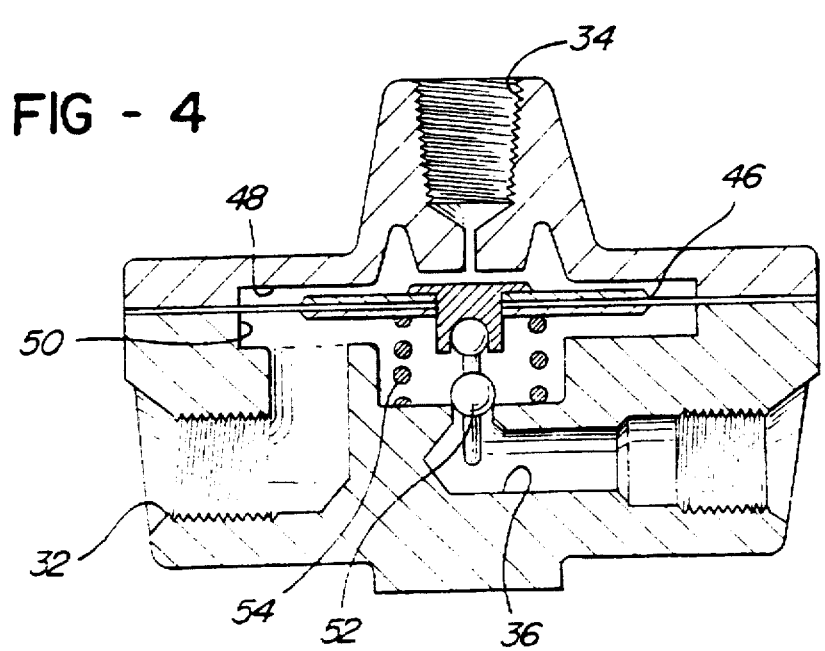
FIG. 4 is a cross-sectional view of the constant differential flow controller.

Referring to the Figures wherein like numerals indicate like or corresponding parts throughout the several views, a cleaning assembly is generally shown at 10. The cleaning assembly 10 is of the type for removing residual coating material from flow passages in a coating material distribution system.

The assembly 10 generally comprises a flow passage 12 for conveying coating material (i.e. paint) to a spraying device 14, and a manifold 16 defining a plurality of individual inlets 17 into the flow passage 12. A coating supply means 18 supplies at least two different coating materials to the manifold 16. Solvent supply means, generally shown at 20, supplies a variable pressure and variable volume flow of solvent to the manifold 16 during a cleaning cycle to remove residual coating material from the manifold and flow passage 12 after a completed coating cycle to prepare for a new coating cycle. The assembly 10 is characterized by flow controlling means generally indicated at 22 for maintaining a constant volume flow of solvent to the manifold 16 independent of solvent pressure fluctuations.

The manifold 16 is a multi-inlet paint manifold of the type typically used in the industry to supply a number of different paints to a central flow passage 12 or line which eventually leads to a paint spray head 14.

The solvent supply means 20 includes atomizing means generally indicated at 24 disposed downstream of the flow controlling means and upstream of the manifold 16 for atomizing the solvent upstream of the manifold. By atomizing the solvent upstream of the manifold 16, one can supply several different manifolds with atomized solvent. The atomizing means 24 includes an atomization chamber or mixing block 26 and gas supply means generally indicated at 28 for supplying gas to the atomization chamber to mix with and atomize the solvent. The flow controlling means 22 provides a constant volume flow of solvent into the atomization chamber 26 independent of pressure variations. This ensures that the solvent will atomize in the desired manner. In prior art assemblies, the volume of solvent supplied to the atomizing means (e.g. the paint manifold in Christian) has been a function of solvent pressure, which is inherently subject to variation. If the pressure varies substantially, the volume of solvent supplied to the atomizing means will also vary. If too much solvent is mixed with the pressurized air, solvent will be wasted.

The flow controlling means 22 includes a constant differential flow controller 30 having a solvent inlet 32, a separate reference solvent inlet 34 and a constant volume solvent outlet 36. The preferred flow controller 30 is sold by Moore Products Company, having headquarters on Sumneytown Pike in Springhouse, Pa., 19477. The particular part has model number 63BU.

There is a flow fork 38 upstream of the flow controlling means dividing the flow of solvent into a first path 40 in fluid communication with the solvent inlet 32 and a second path 42 in fluid communication with the reference solvent inlet 34. The flow controlling means 22 also includes a needle valve 44 disposed along the first flow path 40 downstream of the flow fork 38 and upstream of the constant differential flow controller 30.

The flow controller 30 defines an inner chamber divided by a diaphragm 46 into an upper chamber 48 and a lower chamber 50. The reference inlet 34 feeds into the upper chamber 48. The solvent inlet 32 feeds into the lower chamber 50. The solvent outlet 36 leads from the lower chamber 50. Attached to the diaphragm 46 is a regulating member 52 which controls the size of the outlet 36 in response to movement of the diaphragm. A spring 54 biases the diaphragm 46 up toward the reference inlet 34. Thus, if the pressure of liquid flowing into the upper chamber 48 increases, for example, the diaphragm 46 will move down and the outlet 36 will become smaller in size. As a result, the volume of liquid leaving through the outlet 36 will remain constant independent of solvent pressure unless and until the needle valve 44 upstream of the constant differential flow controller 30 is adjusted. More detailed information on the operation of the flow controlling means may be obtained from Moore Products Company.

The assembly 10 also includes bypass means generally indicated at 56 for providing a direct path for solvent to flow into the atomization chamber 26 without flowing through the needle valve 44 and the constant differential flow controller 30. The bypass means 56 includes a duct 58 branching from the second flow path 42 and extending to the atomization chamber 26. A manual bypass valve 60 is disposed along the duct 58. The bypass means 56 is not an essential part of the invention. It exists only to allow an operator to switch the system back to the prior art method (i.e. where atomization occurs without controlling the volume flow of solvent) if, for example, there is a clog or other malfunction along the flow controlling means 22.

The solvent supply means 20 includes a pressurized solvent source 62 disposed upstream of the flow fork 38 and the bypass means 56. This is the typical solvent source as is commonly used in the art.

A solvent supply tube 64 connects the atomization chamber 26 with the manifold 16. Interposed between the solvent supply tube 64 and the manifold 16 is a needle valve 66 for selectively opening and closing the flow of solvent into the manifold. This follows the common practice in the art to use a needle valve at the manifold opening. However, the opening 68 into the manifold 16 is slightly larger than openings described in the prior art assemblies which atomize the solvent in the paint manifold 16. This is because in the subject invention, the solvent is already atomized when it enters the manifold 16 and so its flow need not be restricted. In the prior art assemblies, the restriction facilitated the atomization of the solvent in the manifold 16.

The gas supply means 28 includes a check valve 70 disposed upstream of the atomization chamber 26. The gas supply means 28 also includes safety valve means 72 disposed upstream of the check valve 70 for preventing flow of solvent upstream of the safety valve means. Several types of safety valves may be used. The safety valve means 72 in the present embodiment includes a valve member (not shown) biased to close the gas flow path or supply line, but maintained in an open, non-closing position by a piece of blocking material (not shown) such as polystyrene foam which will dissolve in the presence of solvent. Accordingly, if solvent flows into the gas supply line up to the point of the safety valve means 72, the solvent will dissolve the blocking material and the valve member will move into a closed position closing the gas supply line. A bypass line (not shown) may be disposed upstream of the safety valve means 72 to serve as a signal or alarm that the gas line is closed. The bypass line (not shown) will provide an alternate conduit for the gas if the gas line is blocked. The bypass line may be fitted with a whistle or similar signalling device (not shown) which can be activated by the flow of gas through the bypass line.

A manual gas regulator 74 is disposed upstream of the safety valve means 72. A shut-off valve 76 is disposed upstream of the manual gas regulator 74. A pressurized gas source 78 is disposed upstream of the shut-off valve 76. The gas supply means 28 also includes a gas supply duct 80 extending directly to the internal flow passage 12 of the manifold 16 to supply gas to the manifold independent of the solvent. This is because the pressurized gas is used by itself to purge paint from the system before the solvent is introduced and also to purge solvent from the system at the end of the cleaning cycle. The gas supply means 28 includes a check valve 82 disposed along the gas supply duct 80 upstream of the internal flow passage 12 of the manifold 16. The gas is introduced into the manifold by means of a needle valve 83, as commonly practiced in the art.

The subject invention is associated with the cleaning assembly 10 as described above. The cleaning assembly 10 is generally used in connection with a vehicle spray painting booth assembly; however, the cleaning assembly 10 can be used with a variety of coating systems. The spray booth assembly includes a spray head 14 disposed downstream of the manifold 16. The spray head 14 is a rotating bell head of the type typically used in spray booths. The assembly also includes a purge or waste recovery tank 84 for receiving and storing solvent used in cleaning the paint distribution system and coating material cleaned out of the paint distribution system by the solvent.

A plurality of valves generally indicated at 86 is disposed upstream of the waste recovery tank 84 and the spray head 14 for controlling the flow of fluid toward the waste recovery tank and the spray head. For example, the bell wash valve 90 can be manipulated to allow liquid solvent from a separate liquid solvent source to flow near the spray head 14. Also, the main needle valve 88 can be manipulated to allow atomized solvent to flow into and through the spray head 14. Thus these valves 86 allow different portions of the spraying assembly near the spray head 14 to be flushed with solvent, and in most situations these valves can direct the solvent and the paint residue into the purge recovery tank 84 rather than out through the spray head 14.

A fluid regulator 92 is disposed upstream of the valves 86. A source of pressurized fluid 94 is disposed in fluid communication with the fluid regulator 92, as is commonly practiced in the art. A flow meter 96 is disposed upstream of the fluid regulator 92.

The solvent supply means 20 includes a source of liquid solvent 98 in fluid communication with the spray head. This liquid solvent source 98 may be and typically is separate from the solvent source 62 supplying solvent into the manifold 16. This source of solvent 98 supplies liquid solvent directly to the spray head 14.

A corresponding inventive method for removing residual coating material from the internal coating conducting passages of a manifold 16 of a coating sprayer assembly includes the steps of: supplying pressurized air to the passages 12,17 of at least one manifold 16 to remove most of the coating material after a coating operation; supplying solvent from a solvent source to the manifold 16 to remove the residual coating material from the passages; and maintaining a constant volume flow of solvent upstream of the manifold 16 independent of solvent pressure fluctuations.

The method further includes the step of dividing the flow of solvent upstream of a restriction 44 and maintaining a constant differential in pressures across the restriction to maintain a constant volume flow of solvent downstream of the restriction and upstream of the manifold 16 independent of solvent pressure fluctuations. The restriction 44 is the needle valve 44. This step in the method describes the action of the flow controlling means 22. This maintaining of a constant differential is accomplished by conducting the first flow 40 through an inlet 32 and outlet 36 of a chamber 48,50 and varying the size of the outlet in response to changes in pressure of the solvent.

The method of removing residual paint further includes the step of atomizing the solvent upstream of the manifold 16. This is accomplished by the step of mixing a constant volume supply of solvent with a supply of pressurized air in a predetermined ratio to atomize the solvent.

Once the solvent is atomized, the method for removing residual paint includes the step of conducting the atomized solvent to the manifold 16.

In operation, the manifold 16 supplies a given paint into the flow passage 12 which is eventually sprayed onto a surface by the spray head 14. When the painting is completed the paint ceases to flow through the system. Before a different paint can be used the system must be cleaned or purged of the paint previously used. At this point, pressurized air or other suitable gas may be introduced to blow most of the residual paint from the system and into the purge recovery tank 84. Next, a constant volume supply of solvent and a supply of pressurized air are mixed in the atomization chamber 26 to atomize the solvent. The atomized solvent travels downstream to the manifold 16 where it enters the paint system to flush out residual paint. The valves 86 can be manipulated to divert the solvent either through a portion of the system near the spray head 14 or through the conduits leading to the purge recovery tank 84.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A cleaning assembly (10) for removing residual coating material from flow passages in a coating material distribution system, said assembly (10) comprising:

a manifold (16) having a flow passage and a plurality of individual inlets (17) in fluid communication with said flow passage (12);

solvent supply means (20) in communication with said manifold for supplying a variable pressure and variable volume flow of solvent to said manifold (16) during a cleaning cycle to remove residual coating material from said flow passage (12) after a completed coating cycle to prepare for a new coating cycle;

a constant differential flow controlling means (22) in communication with said manifold, said flow controlling means maintaining a constant volume flow of solvent to said manifold (16) independent of solvent pressure fluctuations; and said flow controlling means (22) including a constant differential flow controller (30) having a solvent inlet (32), a separate reference solvent inlet (34) and a constant volume solvent outlet (36).

2. An assembly (10) as set forth in claim 1 wherein said solvent supply means (20) includes atomizing means (24) disposed downstream of said flow controlling means (22) and upstream of said manifold (16) for atomizing the solvent upstream of said manifold (16), said flow controlling means providing a constant volume flow of solvent into said atomizing means.

3. An assembly (10) as set forth in claim 2 wherein said atomizing means (24) includes an atomization chamber (26) and gas supply means (28) for supplying gas to said atomization chamber to mix with and atomize the solvent.

4. An assembly (10) as set forth in claim 3 including a flow fork (38) upstream of said flow controlling means (22) dividing the flow of solvent into a first path (40) in fluid communication with said solvent inlet (32) and a second path (42) in fluid communication with said reference solvent inlet (34).

5. An assembly (10) as set forth in claim 4 wherein said flow controlling means (22) includes a needle valve (44) disposed along said first flow path (40) downstream of said flow fork (38) and upstream of said constant differential flow controller (30).

6. An assembly (10) as set forth in claim 5 including bypass means (56) in communication with said atomization chamber for providing a direct path for solvent to flow into said atomization chamber (26) without flowing through said needle valve (44) and said constant differential flow controller (30).

7. An assembly (10 as set forth in claim 6 wherein said solvent supply means (20) includes a pressurized solvent source (62) disposed upstream of said flow fork (38) and said bypass means (56).

8. An assembly (10) as set forth in claim 6 wherein said bypass means (56) includes a bypass duct (58) branching from said second flow path (42) and extending to said atomization chamber (26).

9. An assembly (10) as set forth in claim 8 including a manual bypass valve (60) disposed along said bypass duct (58).

10. An assembly (10) as set forth in claim 3 wherein said gas supply means (28) includes a check valve (70) disposed upstream of said atomization chamber (26).

11. An assembly (10) as set forth in claim 10 wherein said gas supply means (28) includes safety valve means (72) disposed upstream of said check valve (70) for preventing flow of solvent upstream of said safety valve means.

12. An assembly (10) as set forth in claim 11 wherein said gas supply means (28) includes a manual gas regulator (74) disposed upstream of said safety valve means (72).

13. An assembly (10) as set forth in claim 12 wherein said gas supply means (28) includes a shut-off valve (76) disposed upstream of said manual gas regulator (74).

14. An assembly (10) as set forth in claim 13 wherein said gas supply means (28) includes a pressurized gas source (78) disposed upstream of said shut-off valve (76).

15. An assembly (10) as set forth in claim 3 wherein said gas supply means (28) includes a gas supply duct (80) extending directly to said flow passage (12) of said manifold (16) to supply gas to said manifold independent of the solvent.

16. An assembly (10) as set forth in claim 15 wherein said gas supply means (28) includes a check valve (82) disposed along said gas supply duct upstream of said flow passage (12).

* * * * *